US012561423B2

(12) United States Patent
    Swaminathan

(10) Patent No.: US 12,561,423 B2
(45) Date of Patent: Feb. 24, 2026

(54) GENERATING TOKEN VALUE FOR ENABLING A NON-APPLICATION CHANNEL TO PERFORM OPERATION

(71) Applicant: Truist Bank, Charlotte, NC (US)

(72) Inventor: Sudhakar Swaminathan, Duluth, GA (US)

(73) Assignee: Truist Bank, Charlotte, NC (US)

( * ) Notice: Subject to any disclaimer, the term of this patent is extended or adjusted under 35 U.S.C. 154(b) by 258 days.

(21) Appl. No.: 17/946,506

(22) Filed: Sep. 16, 2022

(65) Prior Publication Data

US 2024/0095336 A1     Mar. 21, 2024

(51) Int. Cl.
    *H04L 9/40* (2022.01)
    *G06F 21/44* (2013.01)
    *G06F 21/45* (2013.01)
    *G06F 21/62* (2013.01)
    *H04L 9/32* (2006.01)

(52) U.S. Cl.
    CPC .............. *G06F 21/45* (2013.01); *G06F 21/44* (2013.01); *G06F 21/629* (2013.01); *H04L 9/3213* (2013.01); *H04L 9/3297* (2013.01); *H04L 63/08* (2013.01); *H04L 63/0807* (2013.01); *H04L 63/18* (2013.01); *H04L 2463/121* (2013.01)

(58) Field of Classification Search
    CPC ........ G06F 21/45; G06F 21/44; G06F 21/629; G06F 21/00; G06F 21/577; G06Q 40/02; G06Q 20/00; H04L 63/1433; H04L 63/08; H04L 63/18
    See application file for complete search history.

(56) References Cited

U.S. PATENT DOCUMENTS

| | | | |
|---|---|---|---|
| 9,577,999 B1 * | 2/2017 | Lindemann | G06Q 20/12 |
| 10,354,054 B2 * | 7/2019 | Kobres | G06Q 20/40145 |
| 10,454,913 B2 * | 10/2019 | Maninder | G06F 21/44 |
| 10,733,594 B1 * | 8/2020 | Dai Zovi | H04L 63/1425 |
| 11,005,812 B2 * | 5/2021 | Irwan | H04L 63/08 |
| 11,087,016 B1 * | 8/2021 | Moore | G06F 21/31 |

(Continued)

FOREIGN PATENT DOCUMENTS

| | | | | |
|---|---|---|---|---|
| AU | 2015200732 B2 * | 9/2016 | | G06Q 20/3226 |
| GB | 2503650 A * | 1/2014 | | G06F 21/445 |
| KR | 20140032270 A * | 3/2014 | | G06F 21/31 |

*Primary Examiner* — Hadi S Armouche
(74) *Attorney, Agent, or Firm* — Kilpatrick Townsend & Stockton LLP; Michael A. Springs, Esq.

(57)     ABSTRACT

A server can receive a first request from an application executing on a user device to perform a first operation from a first subset of operations capable of being performed in response to a request from the application executing on the user device. The server can output a first command to cause the first operation to be performed. The server can receive a second request to perform a second operation from a second subset of operations that are incapable of being performed in response to the request from the application executing on the user device. The server can receive, via a non-application channel, a token value that is generated by the application executing on the user device. The server can validate the token value received via the non-application channel. The server can, in response to validating the token value received via the non-application channel, outputting a second command to cause the second operation to be performed.

20 Claims, 6 Drawing Sheets

(56) References Cited

U.S. PATENT DOCUMENTS

| | | | |
|---|---|---|---|
| 11,184,173 B2* | 11/2021 | Abadir | H04L 63/18 |
| 11,329,823 B2* | 5/2022 | Kurian | H04L 9/3268 |
| 11,930,122 B2* | 3/2024 | Kinney | H04L 63/083 |
| 2007/0050840 A1* | 3/2007 | Grandcolas | G07F 7/1008 |
| | | | 726/5 |
| 2009/0070583 A1* | 3/2009 | von Mueller | H04L 9/3234 |
| | | | 713/168 |
| 2010/0107222 A1* | 4/2010 | Glasser | H04L 63/168 |
| | | | 726/3 |
| 2013/0167214 A1* | 6/2013 | Sanno | H04L 63/1441 |
| | | | 726/7 |
| 2015/0047007 A1* | 2/2015 | Colnot | H04L 9/3271 |
| | | | 726/7 |
| 2015/0073998 A1* | 3/2015 | Alsina | G06Q 20/12 |
| | | | 705/75 |
| 2015/0349960 A1* | 12/2015 | Bagley | H04L 9/3228 |
| | | | 713/168 |
| 2016/0260089 A1* | 9/2016 | Chen | G06Q 20/367 |
| 2016/0364729 A1* | 12/2016 | Ruparelia | G06Q 20/1085 |
| 2017/0118640 A1* | 4/2017 | Lee | H04L 63/08 |
| 2019/0080331 A1* | 3/2019 | Howald | H04L 9/006 |
| 2019/0140970 A1* | 5/2019 | Reston | H04L 67/14 |
| 2020/0211016 A1* | 7/2020 | Ju | G06Q 40/02 |
| 2020/0213310 A1* | 7/2020 | Ju | G06Q 20/3674 |
| 2021/0021601 A1* | 1/2021 | Valecha | H04L 9/0872 |
| 2021/0065176 A1* | 3/2021 | Ortiz | G06Q 20/322 |
| 2022/0277306 A1* | 9/2022 | Levitt | G06Q 20/4014 |
| 2023/0020843 A1* | 1/2023 | Bowers | H04L 63/0861 |
| 2024/0073290 A1* | 2/2024 | Srinivasan | H04L 67/02 |

* cited by examiner

---

302
Receive a first request from an application executing on a user device to perform a first operation from a first subset of operations capable of being performed in response to a request from the application executing on the user device

↓

304
Output a first command to cause the first operation to be performed

↓

306
Receive a second request to perform a second operation from a second subset of operations that are incapable of being performed in response to the request from the application executing on the user device

308
Receive, via a non-application channel, a token value that is generated by the application executing on the user device

↓

310
Validate the token value received via the non-application channel

↓

312
Output a second command to cause the second operation to be performed

FIG. 3

GENERATING TOKEN VALUE FOR ENABLING A NON-APPLICATION CHANNEL TO PERFORM OPERATION

TECHNICAL FIELD

The present disclosure relates to token values and, more particularly (although not necessarily exclusively), to an application that can generate a token value for enabling a non-application channel to perform an operation that is incapable of being performed in response to a request from the application.

BACKGROUND

An application can authenticate a user for enabling the user to access certain functions or data that may be associated with the user account. Authenticating the user can involve prompting the user for a password. The application can transmit the password to the server. The server can determine whether the password matches a password stored in the server, and if the password is correct, can grant the user access to the functions or data that may be associated with the user account.

SUMMARY

In one example, a server can include a processor and a memory. The memory can include program code that is executable by the processor. The program code can be executed by the processor for causing the processor to receive a first request from an application executing on a user device to perform a first operation from a first subset of operations capable of being performed in response to a request from the application executing on the user device. The processor can output a first command to cause the first operation to be performed. The processor can receive a second request to perform a second operation from a second subset of operations that are incapable of being performed in response to the request from the application executing on the user device. The processor can receive, via a non-application channel, a token value that is generated by the application executing on the user device. The processor can validate the token value received via the non-application channel. The processor can, in response to validating the token value received via the non-application channel, outputting a second command to cause the second operation to be performed.

BRIEF DESCRIPTION OF THE DRAWINGS

FIG. 3 is a flow chart of a process by which an application can generate a token value for enabling a non-application channel to perform an operation that is incapable of being performed in response to a request from the application.

DETAILED DESCRIPTION

Figure 1:
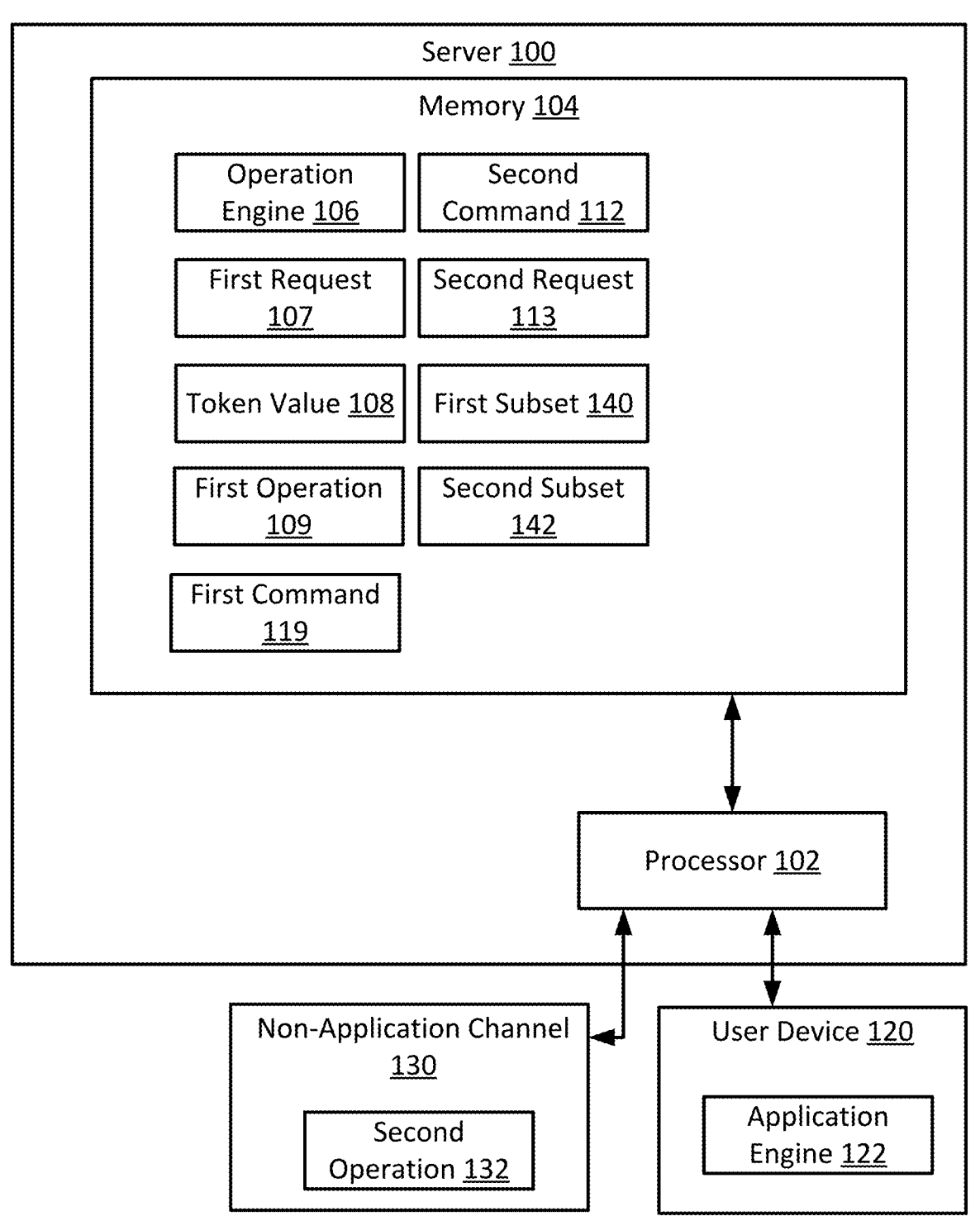
FIG. 1 is a block diagram of a server that can be used in conjunction with an application that can generate a token value for enabling a non-application channel to perform an operation that is incapable of being performed in response to a request from the application.

Certain aspects and features relate to an application that can generate a token value for enabling a non-application channel to perform an operation that is incapable of being performed in response to a request from the application. The application can be a program executing on a user device. The user device can be communicatively coupled with a server for validating the token value and enabling the non-application channel to perform the operation that is incapable of being performed in response to requests from the application. The token value can include a string of characters, a numeric value, or with any other suitable data type. In some examples, the application can generate new token values continually based on a timestamp associated with the application.

The server can receive a first request from the application executing on a user device to perform a first operation from a first subset of operations capable of being performed in response to a request from the application executing on the user device. Operations from the first subset of operations may be subject to fewer security measures and may not require user verification prior to performing. The server can output a first command to cause the first operation to be performed.

The server can receive a second request to perform a second operation from a second subset of operations that are incapable of being performed in response to the request from the application executing on the user device. In some examples, the second operation can be a financial transaction, such as a wire transfer. The second operation can be initiated by a clerk, manager, or other representative of the bank. The server can receive, via a non-application channel, a token value that is generated by the application executing on the user device. The server can validate the token value received via the non-application channel. The server can, in response to validating the token value received via the non-application channel, output a second command to cause the second operation to be performed. The non-application channel can receive the second command. In some examples, the non-application channel can include a second server. The non-application channel can include any number of computers or entities that can cooperate to perform operations that may not be performed by the server alone.

The second server can be communicatively coupled, via a secure network, with a computing device in a physical bank branch location that is associated with an entity, such as a bank. The second server can perform the second operation in response to receiving the second command from the server. The second server can be separate from the server but communicatively coupled with the server for transmitting token values and requests to perform operations.

In the following description, for the purposes of explanation, specific details are set forth to provide a thorough understanding of various implementations and examples. Various implementations can be practiced without these specific details. The figures and description are not intended to be restrictive.

FIG. 1 is a block diagram of a server 100 that can be used in conjunction with an application engine 122 that can generate a token value 108 for enabling a non-application channel 130 to perform an operation that is incapable of being performed in response to a request from the application engine 122. The server 100 can include a processor 102. The processor 102 can be coupled to a memory 104. The processor 102 can include one processor or multiple processors. Examples of the processor 102 include a Field-Programmable Gate Array (FPGA), an application-specific integrated circuit (ASIC), and a microprocessor. The processor 102 can execute an operation engine 106 stored in the memory 104 to perform one or more computing operations. In some examples, the operation engine 106 can include processor-specific instructions generated by a compiler or an interpreter from code written in any suitable computer-programming language, such as C, C++, C#, and Java.

The memory 104 can include one memory device or multiple memory devices. The memory 104 can be volatile or non-volatile, in that the memory 104 can retain stored information when powered off. Examples of the memory 104 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 102 with the operation engine 106 or other instructions. Non-limiting examples of a computer-readable medium include magnetic disks, memory chips, ROM, random-access memory (RAM), an ASIC, a configured processor, optical storage, or any other medium from which a computer processor can read the operation engine 106.

The server 100 can receive a first request 107 from the application engine 122 executing on a user device 120 to perform a first operation 109 from a first subset of operations capable of being performed in response to a request from the application engine 122 executing on the user device 120. Operations from the first subset of operations may be subject to fewer security measures and may not require additional user verification prior to being performed. The server 100 can output a first command 119 to cause the first operation 109 to be performed. In some examples, the server 100 can perform the first command 119. In some examples, the server 100 can output the first command to the The server 100 can receive a second request 113 to perform a second operation 132 from a second subset of operations that are incapable of being performed in response to the request from the application engine 122 executing on the user device 120. For example, the second operation 132 from the second subset of operations may be incapable of being performed in response to the request from the application engine 122 because the second operation 132 may involve a secure system that can require additional security steps that cannot be satisfied by the request from the application engine 122 alone. The secure system can include multiple entities. In an illustrative example, the secure system can include a distributed computing environment associated with a first entity. The secure system can also include a second distributed computing environment associated with a second entity.

In some examples, the second entity can be different from the first entity. For example, the first entity can include a bank, and the second entity can include a second bank that is different from the first bank. The first entity can have a first set of security measures in place, and the second entity can have a second set of security measures in places. The second operation 132 may not be performed until the first set of security measures and the second set of security measures are satisfied. In some examples, the secure system can include one or more physical, non-digital systems. For example, the request from the application engine 122 may not be able to interface with the one or more non-digital systems directly. In other words, the secure system can render the second operation 132 incapable of being performed in response to requests from the application engine 122 executing on the user device 120 by preventing the application engine 122 from interfacing with the one or more non-digital systems.

In some examples, the second operation 132 can be a financial transaction, such as a wire transfer. The second operation 132 can be initiated by a clerk, manager, or other representative of the bank. Additionally or alternatively, the second operation 132 can be initiated by the user. The server 100 can receive, via a non-application channel 130, a token value 108 that is generated by the application engine 122 executing on the user device 120. The server 100 can validate the token value 108 received via the non-application channel 130. The server 100 can, in response to validating the token value 108 received via the non-application channel 130, output a second command 112 to cause the second operation 132 to be performed. The non-application channel 130 can receive the second command 112. In some examples, the non-application channel 130 can include a second server.

The second server can be communicatively coupled, via a secure network, with a computing device in a physical bank branch location that is associated with an entity, such as a bank. The second server can perform the second operation 132 in response to receiving the second command 112 from the server 100. The second server can be separate from the server 100 but communicatively coupled with the server 100 for transmitting token values and requests to perform operations.

In some examples, the second server can perform the second operation 132. For example, the second server can perform the second operation 132 by adjusting one or more values associated with the second server. Additionally or alternatively, the second server can perform the second operation 132 by prompting a representative of an entity associated with the second server to certify the second operation 132 in order to enable the second operation 132 to be performed.

In some examples, the server 100 can receive the second request 113 prior to receiving the first request 107. The server 100 can include a database. For example, the database can be stored in the memory 104 of the server 100. The database can be a relational database, a non-relational database, or any other suitable database. The database can include a list of the first subset of operations 140 that are capable of being performed in response to a request from the application engine 122 executing on the user device 120. The database can also include the second subset of operations 142 that are incapable of being performed in response to the request from the application engine 122 executing on the user device 120. The server 100 can determine that the first request 107 corresponds to the first operation 109. The server 100 can also determine, by accessing the database, that the first operation 109 corresponds to the first subset of operations 140. In response to determining that the first request 107 corresponds to the first operation 109, the server 100 can output the first command 119 to cause the first operation 109 to be performed.

The server can determine, based on the contents of the second request, that the second request corresponds to the second operation. The server 100 can determine, by accessing the database, that the second operation 132 corresponds to the second subset of operations. In response to determining that the second request corresponds to the second operation, the internal logic executing on the server 100 can prevent the server 100 from outputting the second command 112 to cause the second operation 132 to be performed until the server 100 has validated the token value 108. Internal logic that prevents the server 100 from outputting the second command 112 can render the second operation 132 incapable of being performed in response to a request from the application engine 122 executing on the user device 120.

In some examples, the application engine 122 can include a token generator that can generate the token value 108 based on a timestamp. For example, the token generator can generate the token value 108 by providing the timestamp as input to a hash function and using the output of the hash function as the token value 108. The server 100 can request the timestamp associated with the token generator for synchronizing the token generator and the server 100. The server 100 can determine an expected token value based on the timestamp. In some examples, the server 100 can determine the expected token value based on a server timestamp. Synchronizing the server 100 with the token generator can involve comparing the timestamp from the application with the server timestamp to determine whether the timestamps match. In some examples, a token generated with a mismatching timestamp may have an invalid token value. The timestamp can be determined by accessing a hardware clock associated with the user device 120. The server timestamp can be determined by accessing a second hardware clock that is associated with the server 100. After determining the expected token value, the server 100 can determine that the expected token value and the token value 108 match. In some examples, synchronizing the token generator of the application engine 122 can be initiated by the application engine 122. In an illustrative example, the application engine 122 can transmit an application programming interface request to software that is executing on the server 100. The server 100 can receive the application programming interface request and verify the application programming interface request to determine that the application programming interface request has not been tampered with. For example, the application programming interface may be encrypted and decrypted using SSL/TLS or any other suitable security protocol. In some examples, the application programming interface can include the timestamp. In response to verifying the application programming interface request, the server 100 can compare the timestamp to the server timestamp.

After determining that the expected token value 108 and the token value 108 match, the server 100 can validate the token value 108. In some examples, the second server can generate a first encrypted communication channel for communicatively coupling the second server to the application engine 122 for receiving the token value from the application engine 122, and wherein the second server is configured to generate a second encrypted communication channel for communicatively coupling the second server and the server 100 for transmitting requests and token values, and the timestamp associated with the token generator.

Figure 2:
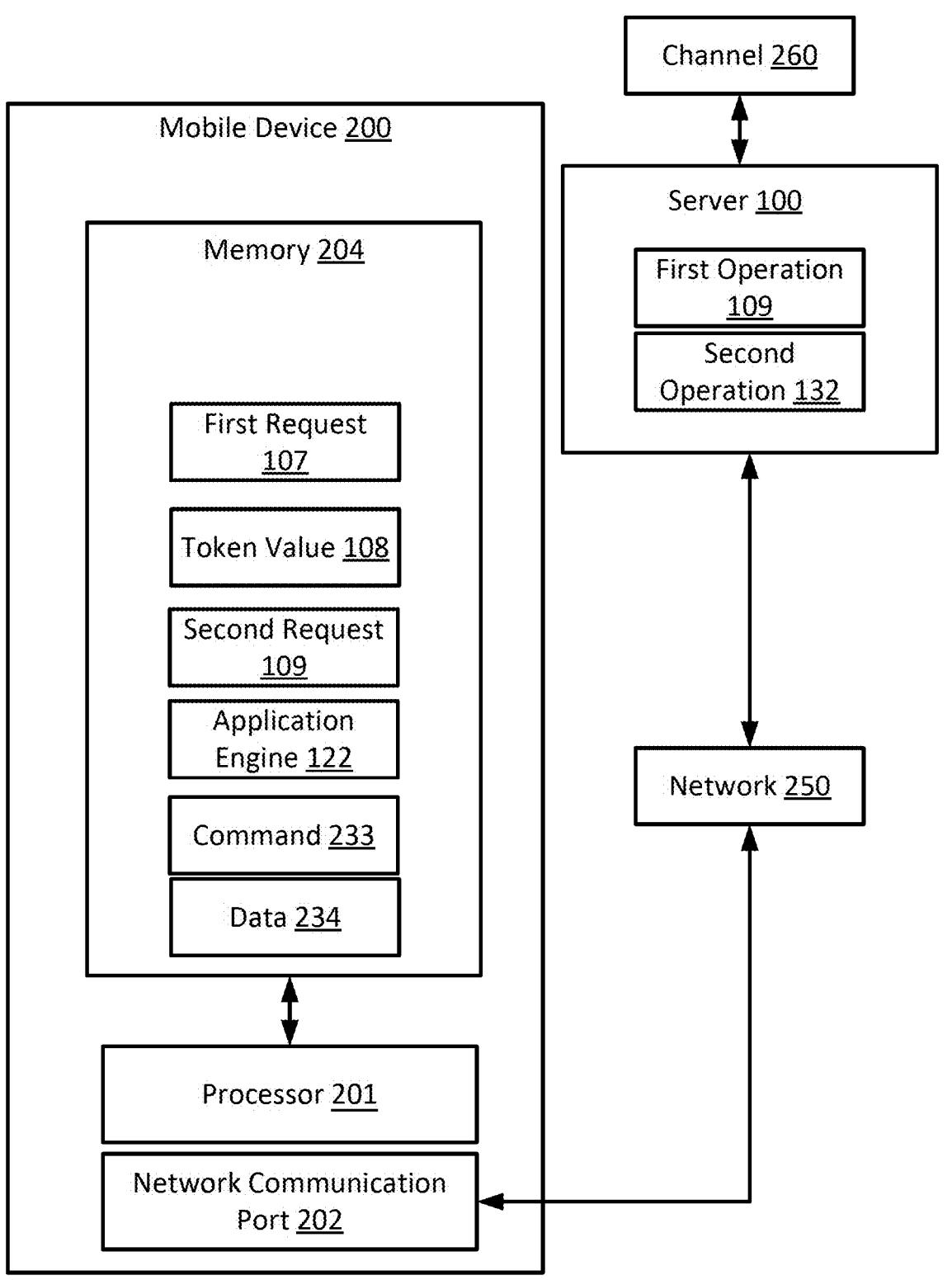
FIG. 2 is a block diagram of a mobile device that can include an application that can generate a token value for enabling a non-application channel to perform an operation that is incapable of being performed in response to a request from the application.

FIG. 2 is a block diagram of a mobile device 200 that can include an application engine 122 that can generate a token value 108 for enabling a channel 260 to perform an operation that is incapable of being performed in response to a request from the application engine 122. The mobile device 200 can include a processor 201 and a memory 204. The memory 204 can include the application engine 122 in the form of program code that is executable by the processor 201 for causing the mobile device 200 to perform computing operations. The mobile device 200 can include a network communication port that can communicate with a server 230 through a network 250. The server 230 can be the same or different from the server 100. In some examples, the mobile device 200 can be a cell phone, tablet, or any other suitable portable computing device with mobile communication capabilities.

The mobile device 200 can output a command to transmit a first request 107 to a server 230 via the network communication port 202. The first request 107 can cause the server 230 to cause a first operation 109 to be performed. The first operation 109 can be part of a first subset of operations that are capable of being performed in response to a request from the application engine 122. The application engine 122 can generate a token value 108. The token value 108 can be used with a second request through a channel 260 that is independent of the application engine 122 to perform a second operation 132 from a second subset of operations that are incapable of being performed by the application engine 122. The mobile device 200 can output a command 233 to transmit, via the network communication port, data 234 about the token value 108 to the server 230 for use in validating the second request 209 to perform the second operation 132. The data 234 can include the token value 108, as well as a type associated with the token value 108 and a timestamp associated with the token value 108.

The channel 260 can be the same as or different from the non-application channel 130. The channel 260 can include a second server that can receive the command 233. The second server can communicate, via a secure network, with a computing device in a physical bank branch location associated with an entity. The entity can be a financial institution, such as a bank. The second server can perform the second operation 132 in response to receiving the command 233 from the server 230. The second server may be separate from the server 230 but can communicate with the server 230 for transmitting token values and requests to perform operations. In some examples, the second operation 132 can be a financial transaction. The second server can perform the second operation 132 by adjusting one or more values associated with the second server. Additionally or alternatively, the second server can prompt a representative of an entity associated with the second server to certify the second operation 132 for enabling the second operation 132 to be performed. The second operation 132 can include a wire transfer or other financial transaction that is configured to adjust a value associated with an account that is managed by the entity.

In some examples, the server 230 can receive the second request prior to receiving the first request 107. The server 230 can include a database that includes the first subset of operations capable of being performed in response to a request from the application engine 122 executing on the mobile device 200 and the second subset of operations that are incapable of being performed in response to the request from the application engine 122 executing on the mobile device 200. The server 230 can determine that the first request 107 corresponds to the first operation 109.

The server 230 can determine, by accessing the database, that the first operation 109 corresponds to the first subset of operations. In response to determining that the first request 107 corresponds to the first operation 109, the internal logic of the server 230 can enable the server 230 to output the command 233 to cause the first operation 109 to be performed. The server 230 can determine that the second request corresponds to the second operation 132. The server 230 can determine, by accessing the database, that the second operation 132 corresponds to the second subset of operations. In response to determining that the second request corresponds to the second operation 132, the internal logic of the server 230 can prevent the server 230 from outputting the command 233 to cause the second operation 132 to be performed until the server 230 has validated the token value 108.

Additionally or alternatively, the server 230 can include additional internal logic for rendering the second operation 132 incapable of being performed in response to a request from the application engine 122 that is executing on the mobile device 200. For example, the database can include a first list of authorized sources that are capable of causing the server to output the command 233 to transmit data about the token value to the server for use in validating the second request to perform the second operation 132 and a second list of unauthorized sources that are not capable of causing the server to output the command 233. The internal logic of the server 100 can prevent the server 100 from outputting the command 233 to transmit data about the token value to the server to cause the second operation 132 to be performed until the server has validated the token value includes program code that is executable by the processor to cause the processor to determine that the command 233 to transmit data about the token value to the server 230 does not belong to the first list. The server can determine that the command 233 to transmit data about the token value to the server belongs to the second list. In response to determining that the command 233 to transmit data about the token value to the server 230 belongs to the second list, the internal logic of the server 230 can prevent the server from causing the second operation 132 to be performed. Preventing the server 230 from causing the second operation 132 to be performed can render the second operation 132 incapable of being performed in response to a request from the application engine 122 executing on the mobile device 200.

FIG. 3 is a flow chart of a process by which an application can generate a token value for enabling a non-application channel to perform an operation that is incapable of being performed in response to a request from the application engine 122.

At block 302, the server 100 receives a first request 107 from an application engine 122 executing on a user device 120 to perform a first operation 109 from a first subset of operations 140 capable of being performed in response to a request from the application engine 122 executing on the user device 120. The first request 107 may not require the user to verify the first request 107. The first operation 109 can include transmitting account data from the server 100 to the user device 120 in response to the request from the application engine 122. Additionally or alternatively, the first operation 109 can include executing an account function on the server 100 in response to the request from the application engine 122. The account function can include adjusting a setting associated with a user account that may be accessed via the user device 120. In some examples, the user device 120 can be a mobile device, such as a cell phone or a tablet. The application engine 122 can be a mobile application.

At block 304, the server 100 outputs a first command 119 to cause the first operation 109 to be performed. The first command 119 can be transmitted from the server 100 to a destination via Transmission Control Protocol (TCP) or any other secure communication protocol. In some examples, the server 100 can encrypt the first command 119 prior to outputting the first command 119. The command 119 can be decrypted when received, which can enable the recipient of the command 119 to evaluate and execute the command 119.

At block 306, the server 100 receives a second request 113 to perform a second operation 132 from a second subset of operations 142 that are incapable of being performed in response to the request from the application engine 122 executing on the user device 120. The server 100 can also receive information associated with the second request 113. For example, the information associated with the second request 113 can be packaged with the second request 113 and can be received by the server 100 simultaneously contemporaneous to receiving the second request 113.

In some examples, the second operation 132 can include a financial transaction. For example, the second operation 132 can involve a wire transaction that cannot be performed by the server 100 alone. The wire transaction can be enabled by a user of the user device 120 via the token value 108. The second operation 132 can involve adjusting a level of access to a network. The server may not be able to adjust the level of access to the network without requiring the user of the user device 120 to authenticate via the token value 108 due to one or more security measures that may be implemented on a system other than the server 100. The second operation 132 can cause a distributed computing system to adjust a processing speed. In some examples, the second operation 132 can cause the distributed computing system to adjust an amount of computing resources that are allocated to a computing device in the distributed computing system. The server 100 may be communicatively coupled with the distributed computing system, but the server 100 may be unable to cause the distributed computing system to reallocate its resources without requiring the user to authenticate via the token value 108. Authenticating via the token value 108 can enable the server 100 to issue a command to enable the distributed computing system to reallocate its computing resources. In some examples, the second operation 132 can involve adjusting a mode of operation of the distributed computing system or adjusting a mode of operation of a computing device associated with the distributed computing system.

In some examples, the second operation 132 can cause the non-application channel to implement an additional security measure. For example, the second operation 132 can cause the non-application channel to enable a password-based verification step. The non-application channel may not allow the user device 120 to enable the password-based verification step directly, but the non-application channel can disable the password in response to authentication via the token value 108. In some examples, the second operation 132 can cause the non-application channel to remove a security measure associated therewith. For example, the second operation 132 can disable a password associated with a user account that can be accessed by the user device 120. The non-application channel may not allow the user device 120 to disable the password directly, but the non-application channel can disable the password in response to authentication via the token value 108.

In some examples, the second operation 132 can involve transmitting sensitive data from the non-application channel to a user. The non-application channel may prevent the sensitive data from being transmitted to the user in response to requests from the application engine 122, but the non-application channel may enable the sensitive data to be transmitted in response to authentication via the token value 108.

At block 308, the server 100 receives, via a non-application channel, a token value 108 that is generated by the application engine 122 executing on the user device 120. The server 100 can receive the token value 108 via a secure communication channel that can prevent malicious actors from intercepting or otherwise tampering with the token value 108. For example, the token value 108 can be encrypted prior to being transmitted to the server 100. The server 100 can decrypt or otherwise decode the token value 108 upon receiving the token value 108.

At block 310, the server 100 validates the token value received via the non-application channel 130. Validating the token value 108 can involve requesting a timestamp associated with the token value 108, determining an expected token value based on the timestamp, and subsequent to determining the expected token value, and determining that the expected token value and the token value 108 match.

At block 312, in response to validating the token value 108 received via the non-application channel, the server 100 outputs a second command 112 to cause the second operation 132 to be performed. The second command 112 can include an application programming interface request that can correspond to an application programming interface that is associated with the non-application channel.

Figure 4:
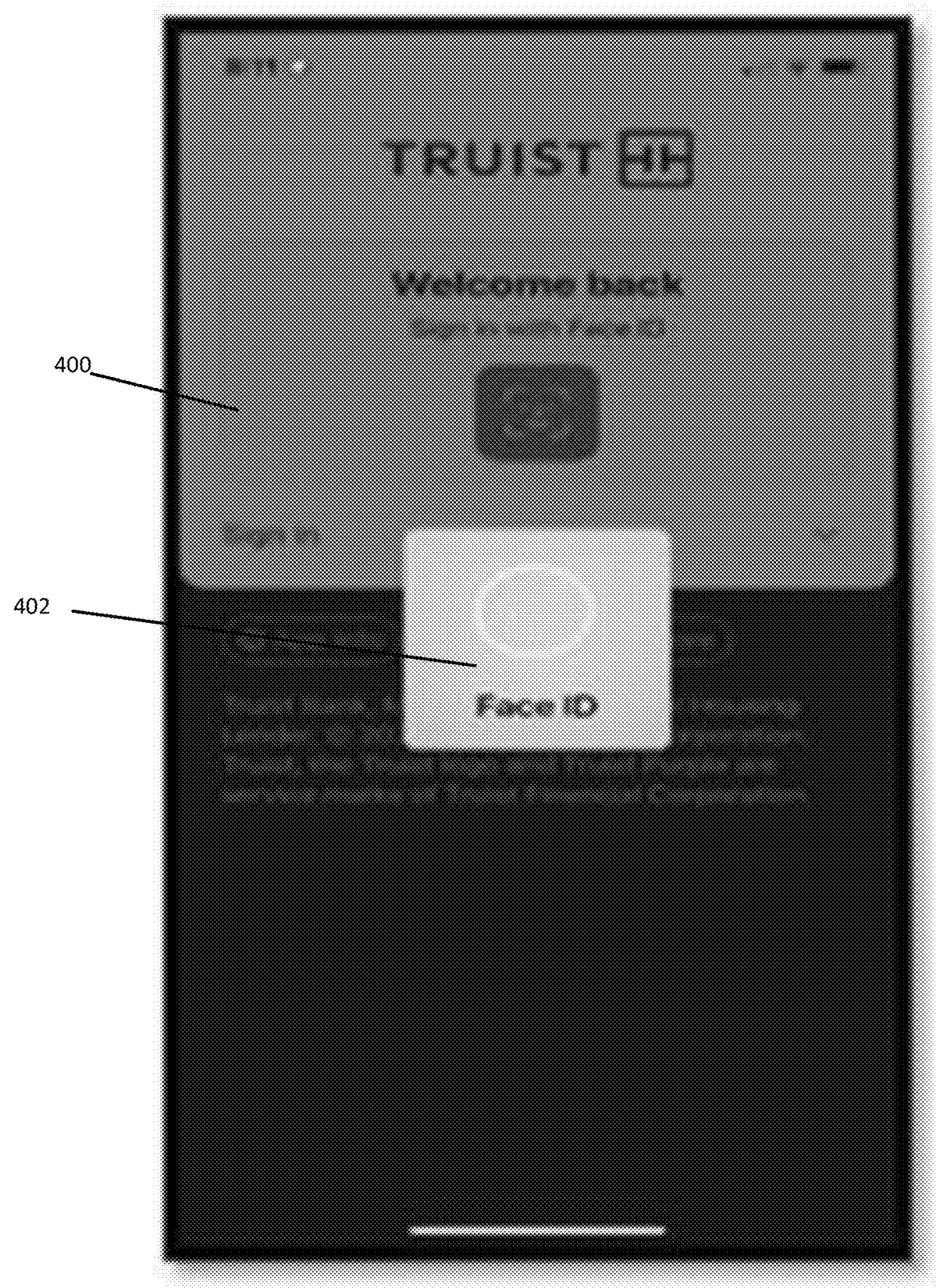
FIG. 4 is an example of a graphical user interface that can be included in an application that can generate a token value for enabling a non-application channel to perform an operation that is incapable of being performed in response to a request from the application.

FIG. 4 is an example of a graphical user interface 400 that can be included in an application engine 122 that can generate a token value for enabling a non-application channel to perform an operation that is incapable of being performed in response to a request from the application engine 122. The graphical user interface 400 can prompt for a user to provide biometric identification to enable the user to access data and functions associated with the application engine 122. The prompt can include an indicator 402 that can indicate to the user that the user device 120 is attempting to obtain the biometric information. The application engine 122 can verify the biometric identification, by comparing the obtained biometric information to previously stored biometric identification. After verifying the biometric information, the graphical user interface 400 can enable the user to use the application engine 122 to generate a token value.

Figure 5:
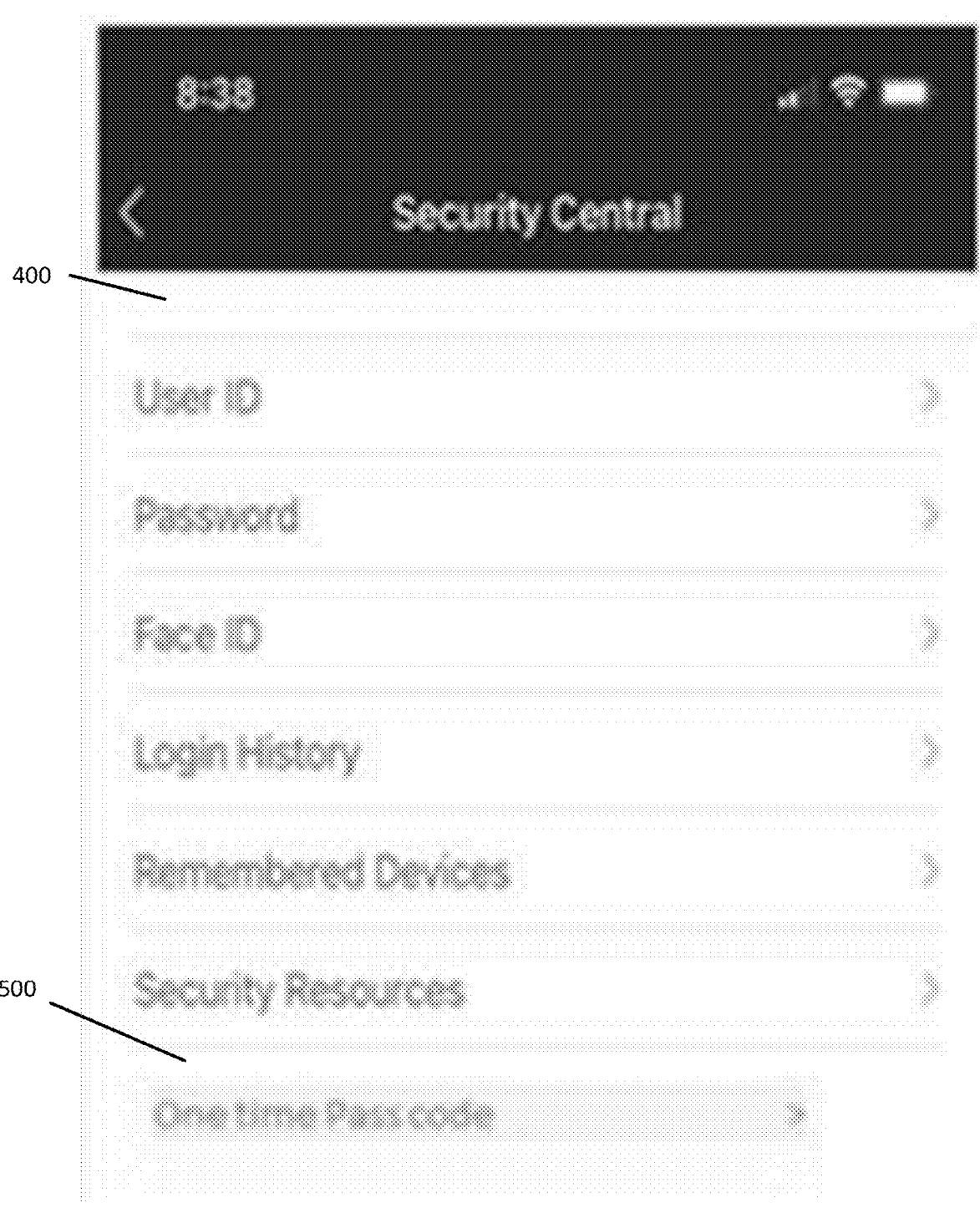
FIG. 5 is an example of a graphical user interface that can be included in an application that can generate a token value for enabling a non-application channel to perform an operation that is incapable of being performed in response to a request from the application.

FIG. 5 is an example of a graphical user interface 400 that can be included in an application engine 122 that can generate a token value 108 for enabling a non-application channel 130 to perform an operation that is incapable of being performed in response to a request from the application engine 122. The graphical user interface 400 can include an interactive object 500 that can cause the graphical user interface 400 to display a token value 108. The token value 108 can be generated using a secure cryptographic hashing algorithm, such as MD5, SHA-1, SHA-2, and SHA-256. The location of the token value 108 on the graphical user interface 400 and the locations of any interactive elements associated therewith can be adjusted to provide an ease-of-use to the user of the graphical user interface 400. For example, the graphical user interface can receive an estimate of a typical resting position of a finger associated with the user of the graphical user interface 400.

The graphical user interface 400 can be reorganized to render the token value 108 easier to access by adjusting its location to reflect the location of the typical resting position of the finger associated with the user of the graphical user interface 400.

Figure 6:
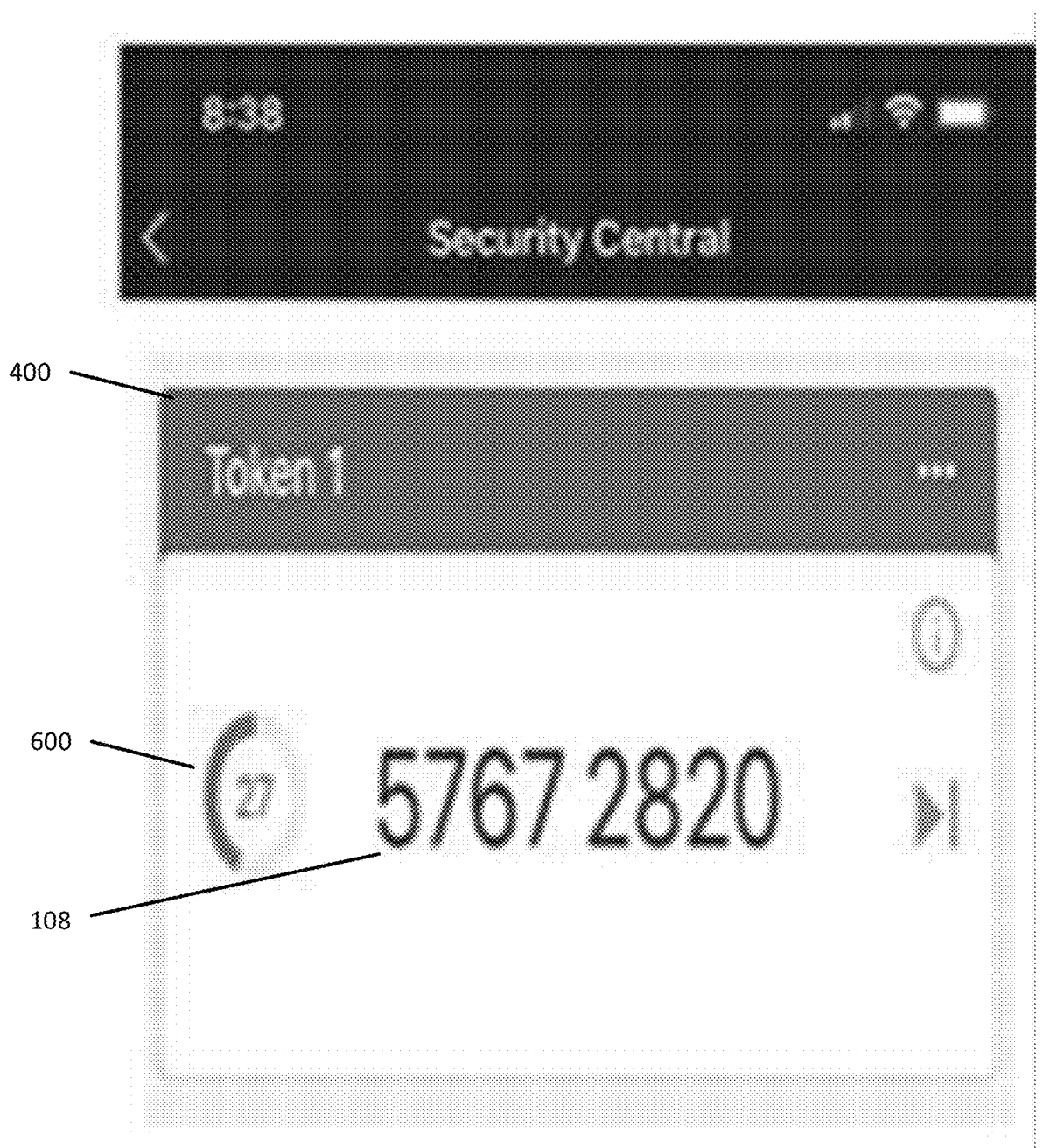
FIG. 6 is an example of a graphical user interface that can be included in an application that can generate a token value for enabling a non-application channel to perform an operation that is incapable of being performed in response to a request from the application.

FIG. 6 is an example of a graphical user interface 400 that can be included in an application engine 122 that can generate a token value for enabling a non-application channel 130 to perform an operation that is incapable of being performed in response to a request from the application engine 122. The graphical user interface 400 can include the token value 108 The token value 108 can expire after a set amount of time. The graphical user interface 400 can display a timer 600 that can indicate the set amount of time after which the token value 108 will expire. The timer 600 can also display an elapsed time and a graphic depicting the elapsed time in relation to the set amount of time after which the token value 108 will expire. The user can select one or more settings to adjust the location of the token value 108 and the location of the timer 600. The user can also select the one or more settings to adjust the size of the timer 600 and token value. Adjusting the locations and sizes of the token value and the timer 600 in response to user input can improve user readability and can improve a speed of user-related processes associated with the application engine 122 and the graphical user interface 400.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A server comprising:
   a processor; and
   a memory comprising program code that is executable by the processor for causing the processor to:
   receive a first request from an application executing on a user device to perform a first operation from a first subset of operations that are performable in response to the first request from the application executing on the user device, the first operation comprising an operation to adjust a setting associated with an account accessible via the application executing on the user device;
   output a first command to cause the first operation to be performed;
   receive a second request to perform a second operation;
   determine that the second operation is included in a second subset of operations that involve a second server and a first associated number of security measures that is larger than a second associated number of security measures of the first operation, wherein the first associated number of security measures includes a token-based security measure that is not included in the second associated number of security measures;
   prevent instructions for causing the second operation to be performed from being generated without a validated token value to satisfy the token-based security measure;
   receive, via a non-application channel, a token value that is a first output of a hash function with input as a first timestamp generatable by the application executing on the user device;

generate an expected token value by accessing a hardware clock to determine a second timestamp corresponding with the first timestamp and by providing the second timestamp as input to the hash function to produce a second output of the has function that includes the expected token value;

validate the token value received via the non-application channel by determining that the first output of the hash function and the second output of the hash function match; and in response to validating the token value received via the non-application channel, outputting a second command to cause the second operation to be performed, wherein a second server is configured to generate a first encrypted communication channel for communicatively coupling the second server to the application for receiving the token value from the application, and wherein the second server is configured to generate a second encrypted communication channel for communicatively coupling the second server and the server for transmitting requests, token values, and a timestamp associated with a token generator.

2. The server of claim 1, wherein the non-application channel comprises a second server that is configured to receive the second command, wherein the second server is communicatively coupled, via a secure network, with a computing device in a physical bank branch location associated with an entity, and wherein the second server is configured to perform the second operation in response to receiving the second command from the server, and wherein the second server is separate from the server and communicatively coupled with the server for transmitting token values and requests to perform operations.

3. The server of claim 2, wherein the second server is configured to perform the second operation by adjusting one or more values associated with the second server, and prompting a representative of an entity associated with the second server to certify the second operation for enabling the second operation to be performed, and wherein the second operation is a wire transfer that is configured to adjust a value associated with an account that is managed by the entity.

4. The server of claim 3, wherein the server is configured to receive the second request prior to receiving the first request, and wherein the server further comprises:

a database comprising:

the first subset of operations performable in response to a request from the application executing on the user device; and the second subset of operations that are not performable in response to the request from the application executing on the user device; and wherein the program code is further executable by the processor for causing the processor to:

determine that the first request corresponds to the first operation;

determine, by accessing the database, that the first operation corresponds to the first subset of operations;

in response to determining that the first request corresponds to the first operation, enable the server to output the first command to cause the first operation to be performed;

determine that the second request corresponds to the second operation;

determine, by accessing the database, that the second operation corresponds to the second subset of operations; and in response to determining that the second request corresponds to the second operation, prevent the server from outputting the second command to cause the second operation to be performed until the server has validated the token value.

5. The server of claim 4, wherein the database includes a first list of authorized sources that are configured to cause the server to output the second command and a second list of unauthorized sources that are not configured to cause the server to output the second command, and wherein the program code that is executable by the processor for causing the processor to prevent the server from outputting the second command to cause the second operation to be performed until the server has validated the token value includes program code that is executable by the processor to cause the processor to:

determine that the second command does not belong to the first list;

determine that the second command belongs to the second list; and in response to determining that the second command belongs to the second list, prevent the server from outputting the second command.

6. The server of claim 5, wherein the application includes the token generator that is configured to generate the token value based on a timestamp, and wherein the program code that is executable by the processor for causing the processor to validate the token value received via the non-application channel includes program code that is executable by the processor to cause the processor to:

request the timestamp associated with the token generator for synchronizing the token generator and the server;

determine an expected token value based on the timestamp; and subsequent to determining the expected token value, determine that the expected token value and the token value match.

7. The server of claim 6, wherein the second server is configured to generate a first encrypted communication channel for communicatively coupling the second server to the application for receiving the token value from the application, and wherein the second server is configured to generate a second encrypted communication channel for communicatively coupling the second server and the server for transmitting requests and token values, and the timestamp associated with the token generator.

8. A mobile device comprising:

a network communication port configured to communicate with a server through a network;

a processor; and a memory comprising an application that is program code that is executable by the processor for causing the mobile device to:

output a command to transmit, using the network communication port, a first request to a server to cause the server to cause a first operation to be performed, the first operation being from a first subset of operations that are performable in response to the first request from the application, the first operation comprising an operation to adjust a setting associated with an account accessible via the application;

generate a token value configured to be used with a second request through a channel that is independent of the application to perform a second operation from a second subset of operations, wherein operations included in the second subset of operations have a first associated number of security measures that is larger than a second associated number of security measures of the first operation, and wherein the first associated number of security measures includes a token-based security measure that is not included in the second associated number of security measures; and output a command to transmit, using the network communication port, data about the token value to the server for use in validating the second request to perform the second operation, wherein the validating comprises determining that a first output of a hash function and a second output of the hash function match, wherein the first output includes the token value and is generatable by providing a first timestamp to the hash function, wherein the second output includes an expected token value and is generatable by providing a second timestamp based on a hardware clock to the hash function, wherein a second server is configured to generate a first encrypted communication channel for communicatively coupling the second server to the application for receiving the token value from the application, and wherein the second server is configured to generate a second encrypted communication channel for communicatively coupling the second server and the server for transmitting requests, token values, and a timestamp associated with a token generator.

9. The mobile device of claim 8, wherein the channel comprises a second server that is configured to receive the command to transmit data about the token value to the server, wherein the second server is communicatively coupled, via a secure network, with a computing device in a physical bank branch location associated with an entity, and wherein the second server is configured to perform the second operation in response to receiving the command to transmit data about the token value to the server from the server, and wherein the second server is separate from the server and communicatively coupled with the server for transmitting token values and requests to perform operations.

10. The mobile device of claim 9, wherein the second server is configured to perform the second operation by adjusting one or more values associated with the second server, and prompting a representative of an entity associated with the second server to certify the second operation for enabling the second operation to be performed, and wherein the second operation is a wire transfer that is configured to adjust a value associated with an account that is managed by the entity.

11. The mobile device of claim 10, wherein the server is configured to receive the second request prior to receiving the first request, and wherein the server further comprises:

a database comprising:

the first subset of operations performable in response to a request from the application executing on the mobile device; and the second subset of operations that are not performable in response to the request from the application executing on the mobile device; and wherein the program code is further executable by the processor for causing the processor to:

determine that the first request corresponds to the first operation;

determine, by accessing the database, that the first operation corresponds to the first subset of operations;

in response to determining that the first request corresponds to the first operation, enable the server to output the command to cause the first operation to be performed;

determine that the second request corresponds to the second operation;

determine, by accessing the database, that the second operation corresponds to the second subset of operations; and in response to determining that the second request corresponds to the second operation, prevent the server from outputting the command to transmit data about the token value to the server to cause the second operation to be performed until the server has validated the token value.

12. The mobile device of claim 11, wherein the database includes a first list of authorized sources that are configured to cause the server to output the command to transmit data about the token value to the server and a second list of unauthorized sources that are not configured to cause the server to output the command to transmit data about the token value to the server, and wherein the program code that is executable by the processor for causing the processor to prevent the server from outputting the command to transmit data about the token value to the server to cause the second operation to be performed until the server has validated the token value includes program code that is executable by the processor to cause the processor to:

determine that the command to transmit data about the token value to the server does not belong to the first list;

determine that the command to transmit data about the token value to the server belongs to the second list; and in response to determining that the command to transmit data about the token value to the server belongs to the second list, prevent the server from outputting the command to transmit data about the token value to the server.

13. The mobile device of claim 12, wherein the application includes the token generator that is configured to generate the token value based on a timestamp, and wherein the program code that is executable by the processor for causing the processor to validate the token value received via the channel includes program code that is executable by the processor to cause the processor to:

request the timestamp associated with the token generator for synchronizing the token generator and the server;

determine an expected token value based on the timestamp; and subsequent to determining the expected token value, determine that the expected token value and the token value match.

14. The mobile device of claim 13, wherein the second server is configured to generate a first encrypted communication channel for communicatively coupling the second server to the application for receiving the token value from the application, and wherein the second server is configured to generate a second encrypted communication channel for communicatively coupling the second server and the server for transmitting requests and token values, and the timestamp associated with the token generator.

15. A method comprising:

receiving, by a processor, a first request from an application executing on a user device to perform a first operation from a first subset of operations performable in response to the first request from the application executing on the user device;

outputting, by the processor, a first command to cause the first operation to be performed, the first operation comprising an operation to adjust a setting associated with an account accessible via the application executing on the user device;

receiving, by the processor, a second request to perform a second operation;

determining, by the processor, that the second operation is included in a second subset of operations that involve a second server and a first associated number of security measures that is larger than a second associated number of security measures of the first operation, wherein the first associated number of security measures includes a token-based security measure that is not included in the second associated number of security measures;

preventing, by the processor, instructions for causing the second operation to be performed from being generated without a validated token value to satisfy the token-based security measure;

receiving, by the processor and via a non-application channel, a token value that is a first output of a hash function with input as a first timestamp generatable by the application executing on the user device;

generating, by the processor, an expected token value by accessing a hardware clock to determine a second timestamp corresponding with the first timestamp and by providing the second timestamp as input to the hash function to produce a second output of the has function that includes the expected token value;

validating, by the processor, the token value received via the non-application channel by determining that the first output of the hash function and the second output of the hash function match; and in response to validating the token value received via the non-application channel, outputting, by the processor, a second command to cause the second operation to be performed, wherein a second server is configured to generate a first encrypted communication channel for communicatively coupling the second server to the application for receiving the token value from the application, and wherein the second server is configured to generate a second encrypted communication channel for communicatively coupling the second server and the server for transmitting requests, token values, and a timestamp associated with a token generator.

16. The method of claim 15, further comprising:

receiving, by a second server, the second command, communicatively coupling the second server, via a secure network, with a computing device in a physical bank branch location associated with an entity; and performing, by the second server, the second operation in response to receiving the command to transmit data about the token value to the server from the server, wherein the second server is separate from the server and communicatively coupled with the server for transmitting token values and requests to perform operations.

17. The method of claim 16, further comprising:

adjusting, by the second server, one or more values associated with the second server; and prompting, by the second server, a representative of an entity associated with the second server to certify the second operation for enabling the second operation to be performed, wherein the second operation is a wire transfer that is configured to adjust a value associated with an account that is managed by the entity.

18. The method of claim 17, further comprising:

receiving the second request prior to receiving the first request, and wherein the server further comprises:

determining, by the processor, that the first request corresponds to the first operation;

determining, by the processor and by accessing a database, that the first operation corresponds to the first subset of operations;

in response to determining that the first request corresponds to the first operation, enabling, by the processor, the server to output the first command to cause the first operation to be performed;

determining, by the processor, that the second request corresponds to the second operation;

determining, by the processor and by accessing the database, that the second operation corresponds to the second subset of operations; and in response to determining that the second request corresponds to the second operation, preventing, by the processor, the server from outputting the second command to cause the second operation to be performed until the server has validated the token value.

19. The method of claim 18, further comprising:

determining, by the processor and by the database, that the second command does not belong to a list of authorized sources;

determining, by the processor and by the database, that the second command belongs to a list of unauthorized sources; and in response to determining that the second command belongs to the list, preventing, by the processor, the server from outputting the second command.

20. The method of claim 19, wherein the application includes the token generator, wherein the method further comprises:

requesting, by the processor, a timestamp associated with the token generator for synchronizing the token generator and the server;

determining, by the processor, an expected token value based on the timestamp; and subsequent to determining the expected token value, determining, by the processor, that the expected token value and the token value match.

* * * * *